UNITED STATES PATENT OFFICE.

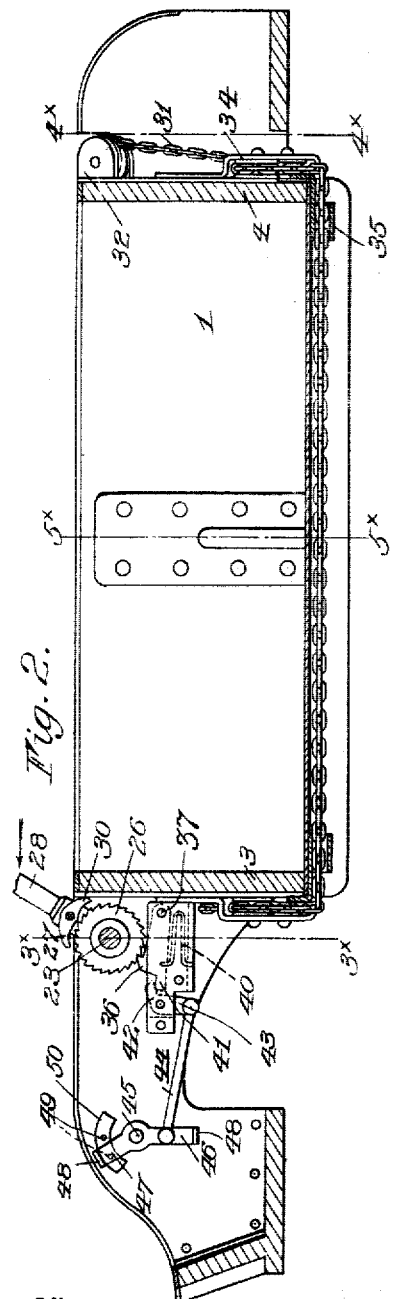

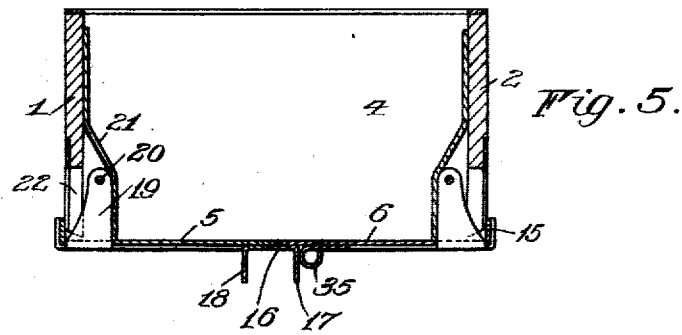
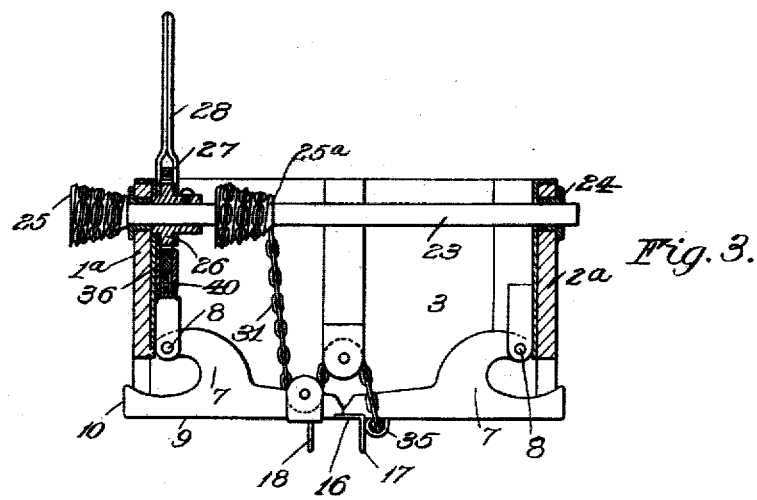
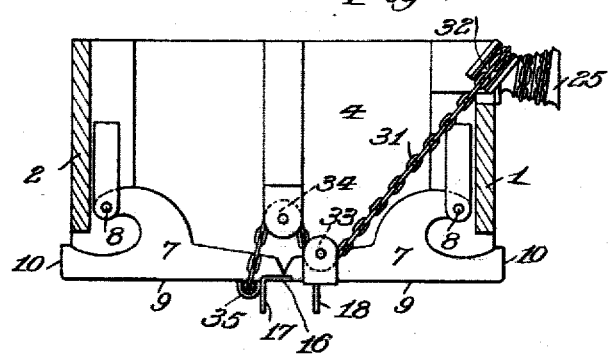

JOHN HEBERLING, OF ROCHESTER, NEW YORK.

DUMPING-WAGON.

No. 811,719. Specification of Letters Patent. Patented Feb. 6, 1906.

Application filed March 6, 1905. Serial No. 248,378.

*To all whom it may concern:*

Be it known that I, JOHN HEBERLING, of Rochester, in the county of Monroe and State of New York, have invented certain new and useful Improvements in Dumping-Wagons; and I do hereby declare the following to be a full, clear, and exact description of the same, reference being had to the accompanying drawings, forming a part of this specification, and to the reference-numerals marked thereon.

My present invention has for its object to provide an improved form of dumping-wagon comprising generally a wagon-box provided with movable bottom section or doors and having suitable mechanism for releasing and closing the latter, which may be controlled by the operator without leaving the seat of the wagon.

To these and other ends my invention consists in certain improvements and combinations of parts, all as will be hereinafter more fully described, the novel features being set forth in the claims at the end of the specification.

In the drawings, Figure 1 is a top plan view of a dumping-wagon constructed in accordance with my invention. Fig. 2 is a longitudinal sectional view on the line $2^\times 2^\times$ of Fig. 1. Fig. 3 is a cross-sectional view on the line $3^\times 3^\times$ of Fig. 2. Fig. 4 is a similar view on the line $4^\times 4^\times$ of Fig. 2, and Fig. 5 is a central cross-sectional view taken on the line $5^\times 5^\times$ of Fig. 2.

Similar reference-numerals in the several figures of the drawings indicate similar parts.

The present illustration of a wagon, showing one embodiment of my invention, comprises a box formed by the side pieces 1 and 2 and the end pieces 3 and 4, and beneath the lower edges of the sides and ends are removable bottom sections or doors 5 and 6. The latter are pivotally connected to the box by hinge members 7, journaled on pintles 8, projecting from the end boards 3 and 4, and which are provided with inwardly-extending flanges 9, projecting beneath the ends of the bottom sections or doors, said hinges also having corner-flanges 10, which extend over and support the vertically-extending flanges 15, arranged on the bottom-sections, and extending upwardly over the outer faces of the sides 1 and 2 of the box to close the joint which would otherwise be formed, thus making a tight box, in which fine material, such as sand or semiliquid substances, such as plaster or moist earth, may be transported without leakage. The meeting edges of the doors are closed by an overlapping piece 16, attached to the door 5, which is in the form of an angle-bar, having a downwardly-extending end 17 serving to strengthen the edge of the door. A similar bar 18 is also provided on the door 6. Each section or door is supported intermediate the hinge members by upwardly-extending arms 19, journaled on pins 20, supported in housings 21, attached to the inner faces of the sides 1 and 2, the latter being slotted, as indicated at 22 in Fig. 5, to permit the outward movement of the arms when the doors are opened.

The operating mechanism for opening and closing the bottom section or doors 5 and 6 is supported on the wagon-box and arranged exteriorly thereof. It comprises a winding-shaft 23, extending transversely of the wagon-box and supported in bearings 24, arranged in apertures provided in the forwardly-extending ends $1^a$ and $2^a$ of the side pieces. One end of the shaft projects laterally beyond one of the sides of the box and carries a winding-drum in the form of a cone 25. A similar cone $25^a$ is also mounted on the shaft between the sides of the box, and adjacent thereto is a ratchet-wheel 26, with which coöperates a pawl 27, pivoted on a lever 28, having bifurcated ends straddling the ratchet-wheel and journaled on the shaft supporting it. The teeth of the ratchet-wheel are so disposed that a movement of the operating-handle toward the front of the wagon, as indicated by the arrow in Fig. 2, will rotate the operating-shaft in a direction to wind up the connections to close the movable sections or doors. When in the inoperative position, the lever or arm 28 rests against the proximate end of the box or other suitably-arranged stop thereon, and to automatically disengage the pawl 27 I provide thereon a rearwardly-extending end 30, which curves downwardly and engages the aforementioned stop, causing its opposite extremity to be revolved upwardly to the position shown in Fig. 2 and automatically disengaged from the ratchet-wheel. The devices or connections for operating the sections or doors are formed by a flexible chain or cable 31, one end of which is connected to the drum 25, from which it extends rearwardly along one side of the wagon-box to the rear corner thereof, where it passes over a guide-pulley or idler 32, supported thereon at an angle, as shown in Fig. 4. At the rear end of the door 5 is an outwardly-extending projection formed by a pulley 33, and located on the end 4 of the box is a similar projection 34, said parts being duplicated at the other end of the door and box, as indicated by 33ª and 34ª. The chain or cable extends downwardly from the idler 32 beneath the projection 33 and over the one 34, passing thence beneath the proximate edge of the door 6, on which it is loosely retained by eyes 35, its extremity passing upwardly over the pulley 34ª and beneath the one 33ª and attached to the drum 25ª. By this arrangement it will be seen that I am enabled to employ a single winding-shaft and one chain or cable for closing both ends of the sections or doors, which may adjust itself if it becomes stretched or elongated after continued and severe use, so that both ends thereof will be bound equally and the ends of the doors 5 and 6 may be tightly closed. By running the chain or cable beneath one of the doors and around projections on the other door and on the box one of said doors will always be closed in advance of the other, permitting the joint between them to be covered by an overlapping piece, such as I have shown.

The detent coöperating with the ratchet-wheel for holding the winding-shaft (indicated by 36) is pivoted below the ratchet-wheel at the point 37 and is operated upwardly into engagement therewith by a spring 40, and at its outer end is a small finger or projection 41. Loosely engaging the latter is an arm 42 of a bell-crank lever, the other end 43 thereof being connected by a rod 44 with a foot-lever pivoted at 45 and having upwardly and downwardly extending ends 46 and 47, respectively, provided with laterally-extending foot-pieces 48. One of the arms is provided with a projection adapted to engage notches 49 in a plate 50, mounted on the side piece end 1ª for holding the foot-lever either in the operative to disengage the detent 36 or the inoperative position, in which it is released from the pawl, as will be understood. This is an advantageous arrangement of the releasing mechanism, because jarring and jolting of the wagon does not tend to move them into engagement with the detent to accidentally disengage it, and it is not necessary to depend upon locking the foot-lever by the projection thereon engaging the plate 50.

A dumping-wagon constructed in accordance with my invention consists of few parts, which are simple, easily manufactured, and are capable of withstanding the severe use to which devices of this nature are subjected.

I claim as my invention—

1. In a dump-wagon, the combination with a box, a movable bottom door thereon and a winding-shaft, extending transversely of the box at one end thereof, of projections on the ends of the door and similar projections on each end of the box, a flexible connection attached at each of its ends to the shaft and passing first beneath the projection at one end of the door thence over the projection on the adjacent end of the box, thence passing over the projection at the other end of the box and beneath the other projection on the door and means for operating the shaft.

2. In a dump-wagon, the combination with a box, movable bottom doors thereon and a winding-shaft extending transversely of the box at one end thereof, of projections on the ends of one of the doors and similar projections on the ends of the box, a flexible connection having its end portions passing beneath said door projections and over those at each end of the box, the intermediate portion of said connection passing beneath the other door and having its two extremities connected to the winding-shaft and means for operating the latter.

3. In a dump-wagon, the combination with a box, movable bottom doors thereon one of which is provided with end projections and a winding-shaft extending transversely of the box at one end thereof, of projections on each end of the box, a chain extending beneath and over the respective projections at the end of the door and box which are adjacent the shaft, thence passing beneath the other door and over and under the projections arranged respectively on the other end of the box and door, the two extremities of the chain extending upwardly from the door projections and being secured to the winding-shaft and means for operating the latter.

4. In a dump-wagon, the combination with a box, a movable bottom thereon and a winding-shaft extending transversely thereof and having an end projecting beyond a side of the box, of projections on the ends of the box, a flexible connection having one end attached to the projecting end of the shaft and extending along one side of the box, thence beneath the bottom and connected at its other extremity to the shaft between the sides of the box.

5. In a dump-wagon, the combination with a box, a movable bottom thereon, a winding-shaft extending transversely thereof at one end of the box and having an end projecting beyond one side thereof and a guide-pulley located at the other end of the box, of a flexible connection attached at one end to the shaft between the box sides and at the other end to the projecting end of the shaft and extending beneath the box and along the side thereof and passing over the guide-pulley thereon.

6. In a dump-wagon, the combination with a box, a movable bottom thereon, a winding-shaft and a flexible connection between it and the bottom, of a ratchet-wheel on the shaft, a locking-pawl coöperating therewith, a lever pivoted on the box, connections between it and said pawl for operating the latter in one direction to disengage it when the lever is moved in one direction and releasing it when said lever is moved in the opposite direction, means for actuating the pawl into operative position independently of the lever and means for rotating the shaft.

7. In a dump-wagon, the combination with a box, a movable bottom thereon, a winding-shaft and a flexible connection between it and the bottom, of a ratchet-wheel on the shaft, a locking-pawl coöperating therewith and means for normally holding it in operative position, a pivoted foot-operated releasing-arm, connections between said arm and the pawl operating only to disengage the pawl from the ratchet-wheel when the arm is moved in one direction and means coöperating with the ratchet-wheel for rotating the shaft.

8. In a dump-wagon, the combination with a box having an end, a movable bottom for the box, a winding-shaft extending transversely of the box adjacent the end thereof and a flexible connection between it and the bottom, of a ratchet-wheel on the shaft, a pivoted operating-lever engaging the end of the wagon-box to limit its movement in one direction, a thrust-pawl on the lever coöperating with the ratchet-wheel when the lever is moved away from the end of the box, said pawl having an end adapted to engage the end of the box to move it into inoperative position when the movement of the lever is arrested.

9. In a dump-wagon, the combination with a box, comprising sides and ends, of movable bottom-sections on the box, upwardly-extending flanges on the bottom-sections embracing the outer faces of the box sides and hinge members supporting the ends of the bottom-sections on the box having corner-pieces supporting said flanges.

JOHN HEBERLING.

Witnesses:
G. WILLARD RICH,
RUSSELL B. GRIFFITH.